United States Patent [19]

Laughter

[11] Patent Number: 4,591,111
[45] Date of Patent: May 27, 1986

[54] THERMAL NAVIGATOR

[75] Inventor: Joseph S. Laughter, Millington, Tenn.

[73] Assignee: University of Tennessee Research Corporation, Knoxville, Tenn.

[21] Appl. No.: 557,745

[22] Filed: Dec. 2, 1983

[51] Int. Cl.$^4$ .............................................. B64D 47/02
[52] U.S. Cl. ...................................... 244/75 R; 244/16
[58] Field of Search ................. 244/76 R, 75 R, 177, 244/194, 16, 1 R; 374/141, 107, 113

[56] References Cited

U.S. PATENT DOCUMENTS

| | | |
|---|---|---|
| 1,166,331 | 12/1915 | Davis . |
| 3,295,353 | 1/1967 | Hagen . |
| 3,350,943 | 11/1967 | Smith . |
| 3,360,993 | 1/1968 | MacMillan .......................... 374/107 |
| 3,458,159 | 7/1969 | Campanella ......................... 244/1 R |
| 3,507,152 | 4/1970 | Ritscher . |
| 3,798,971 | 3/1974 | Lowrance . |
| 4,067,520 | 1/1978 | Hill ....................................... 244/177 |

FOREIGN PATENT DOCUMENTS 64197 12/1945 Sweden .

Primary Examiner—Galen L. Barefoot
Attorney, Agent, or Firm—Luedeka & Neely

[57] ABSTRACT

An apparatus for use in an ultralight aircraft, glider, or sailplane to detect and navigate within thermal updrafts is disclosed. The apparatus includes a right temperature sensor and a left temperature sensor mounted on the wings of the aircraft. A difference circuit and difference indicator measure and indicate whether the right or left sensor is warmer and indicate a measured temperature difference. A derivative circuit and derivative indicator measure and indicate whether the air temperature is increasing or decreasing and indicate a rate of temperature change. The derivative circuit may be responsive to any of the right temperature sensor, the left temperature sensor, both the right and left temperature sensors, or to a third temperature sensor mounted on the aircraft. The apparatus detects thermal updrafts and indicates to the pilot when and how rapidly to turn to obtain the maximum lift from the thermal updraft.

12 Claims, 4 Drawing Figures

THERMAL NAVIGATOR

The present invention relates to aviation instrumentation and more particularly relates to an apparatus for use in ultralight aircraft, sailplanes, or gliders to detect the presence of and to aid in navigation within thermal updrafts.

One of the objectives for the successful soaring of sailplanes, gliders or other unpowered aircraft is to remain aloft for an extended period of time by locating and navigating within upward flows of air. Pilots of ultralight aircraft, while having an engine at their disposal, often seek to locate upward air currents as well to minimize or eliminate use of the engine one in the air. Generally, thermal updrafts are the most commonly used sources of lift for such aircraft although they are difficult to locate and are difficult to stay within. Without instrumentation, thermal air currents are invisible to a pilot and must be detected by observing wing tilt and from the general feel of the aircraft. Successful navigation by such methods is a skill developed through many hours of practice and has been perfected by only a few talented people.

Generally, in a thermal updraft, the warmest and thus most rapidly rising air is located in the center of the updraft. Toward the edges of the updraft, the warm air is mixing with the cooler surrounding air. A thermal gradient results between the surrounding air and the center of the updraft. Navigation within the thermal updraft requires the pilot to locate the warmest air to achieve the maximum lift and, thus, the center of the updraft should be located. In order to obtain the benefit of the thermal updraft for the maximum time period, an ideal flight path is to circle within the thermal while keeping the aircraft within or as close to the center of the thermal as possible.

Instrumentation has been developed to aid in the navigation of gliders in thermal updrafts. For example, some devices include sensors on the wings and a meter, buzzer, or flashing lights to indicate a temperature differential and whether the warmer air is to the right or to the left. Many of these devices, while adequate to locate thermals in many instances, are incapable of providing exact information to the pilot as to how to navigate within the thermal. For example, these devices do not inform the pilot as to how rapidly he must turn to pilot the plane to the center of the thermal or to stay in an optimum position in the thermal. Some of the devices will fail to detect a thermal entirely if the aircraft enters or leaves the thermal head-on so that there is no temperature differential between the sensors on the wings.

Other devices use fore and aft sensors in addition to wing sensors to determine whether the plane is entering or leaving warmer air and, thus, attempt to ameliorate problems associated with the systems having only wing sensors. This approach is problematic because it is difficult to choose fore and aft locations for sensors which are similarly sheltered from the sun and have a similar air flow environment to produce reliable temperature readings. Moreover, gliders, and particularly ultralight aircraft, may not have sufficient distance between fore and aft sections to enable a sufficient temperature differential to be established or may not have suitable mounting locations for fore and aft sensor. An accurate aft reading may be difficult to obtain due to turbulence caused by the plane and the resultant mixing of warmer and cooler air. Also, the engine of an ultralight plane will create heat and turbulence which may distort or interfere with aft temperature readings. Typically, devices having fore and aft sensors are more difficult and expensive to install and the information provided to the pilot is often difficult to interpret.

Thus, a need has arisen for a thermal navigator for ultralight aircraft, gliders or sailplanes without fore and aft sensors which can not only locate thermal updrafts but also can inform the pilot as to how rapidly to turn to successfully navigate within a thermal updraft. Particularly, there is a need for an apparatus which is inexpensive and simple in operation and thus suited for use by the pilot of an ultralight craft who may have had little or no prior soaring experience.

In accordance with one form of the present invention there is provided a thermal navigator for use in an aircraft to detect and navigate within thermal updrafts including right and left temperature sensors mounted on the aircraft, the left temperature sensor being mounted laterally to the left of the right temperature sensor. A temperature difference measuring component determines whether one of the right and left temperature sensors is warmer and measures a temperature difference between the right temperature sensor and the left temperature sensor. The measured temperature difference is indicated by a temperature difference indicator which also indicates which one of the temperature sensors is warmer. The thermal navigator also includes a temperature sensor mounted on the aircraft and connected to a temperature derivative measuring component that determines whether the temperature sensor is becoming warmer or cooler and measures a rate of temperature change at the temperature sensor. The determination of whether the sensor is becoming warmer or cooler is indicated by a temperature derivative indicator. The temperature derivative indicator also indicates the measured rate of temperature change. The sensor connected to the temperature derivative measuring component may be the right or left temperature sensors, or both, or a third sensor.

The present invention may best be understood by reference to the following detailed description when considered in conjunction with the accompanying drawings in which.

Figure 1:
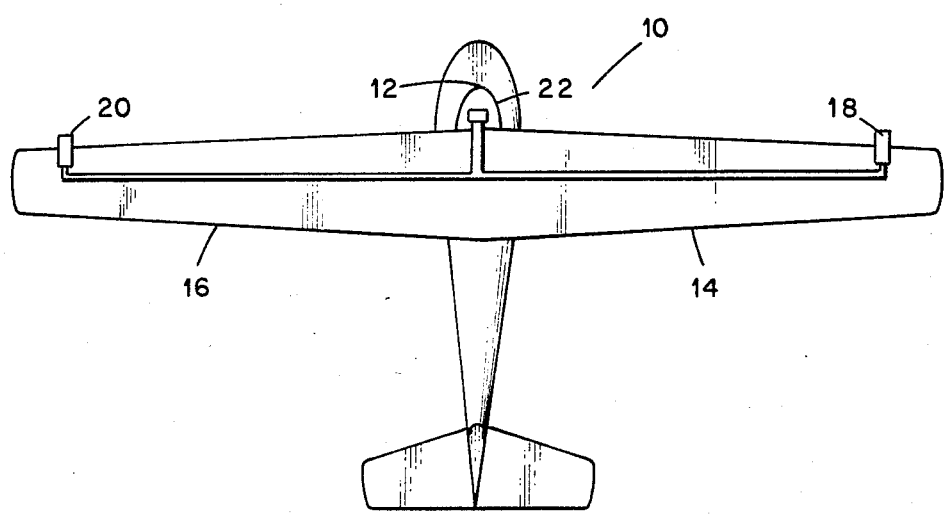
FIG. 1 is a top plan view of an aircraft in which one form of the thermal navigator of the present invention is incorporated.

Referring now to the drawings in which like reference characters designate like or corresponding parts throughout the several views, there is shown in FIG. 1 a top plan view of an aircraft 10 in which one form of the thermal navigator of the present invention is embodied. The aircraft 10 depicted is intended to represent any aircraft such as a glider, sailplane, ultralight aircraft, or the like. From the perspective of a pilot in the cockpit 12, the aircraft 10 includes a right wing 14 and a left wing 16. The term cockpit 12 is intended to include any location on the aircraft 10 where the pilot is accommodated whether or not the location is enclosed as generally depicted in FIG. 1. The thermal navigator includes a right temperature sensor 18 mounted on the right side of the aircraft 10 from the pilot's perspective and a left temperature sensor 20 mounted on the left side of the aircraft 10. FIG. 1 shows that the temperature sensors 18 and 20 may be mounted adjacent to the tips of the wings 14 and 16 to achieve maximum separation between the right temperature sensor 18 and the left temperature sensor 20. Although not shown in FIG. 1, it is preferable for the temperature sensors 18 and 20 to be located on the underside of the wings 14 and 16 so that the sensors 18 and 20 are shielded from direct sunlight and ample airflow about the sensors 18 and 20 is achieved when the aircraft 10 is in flight. The thermal navigator of the present invention includes generally instrumentation 22 mounted in the cockpit 12 which is connected to the sensors 18 and 20, and in some instances additional sensors as hereinafter described, to inform the pilot of the aircraft 10 as to the location of warmer air and whether the aircraft 10 is entering or leaving warmer air. More specifically, the thermal navigator of the present invention measures a temperature difference between the temperature sensors 18 and 20 and informs the pilot as to whether warmer air is to the right or left. In addition, the thermal navigator informs the pilot of the rate of change of air temperature and whether the air temperature is becoming warmer or cooler.

Figure 2:
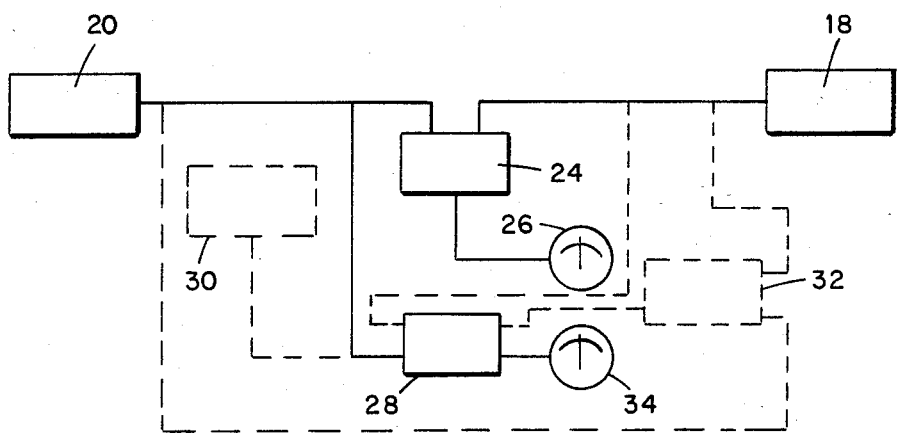
FIG. 2 is a diagrammatical view of one form of the present invention showing its functional components and alternate embodiments are shown in broken lines.

Referring now to FIG. 2, the functional components of the thermal navigator of the present invention are shown. The right temperature sensor 18 produces a signal corresponding to the air temperature. The left sensor 20 similarly produces a signal corresponding to the air temperature. The sensors 18 and 20 may be any type of components responding electrically to temperature, such as thermisters, diodes, or the like. A difference circuit 24 is responsive to the right and left signals to produce a difference signal. The difference circuit 24 produces a positive difference signal having a magnitude corresponding to the difference between the right signal and the left signal when the right signal is greater than the left signal. A negative difference signal having a magnitude corresponding to the difference between the right signal and the left signal is produced when the left signal is greater than the right signal. The thermal navigator includes a difference indicator 26 which is responsive to the positive and negative difference signals and indicates that the right temperature sensor is warmer in response to a positive difference signal as well as indicating a temperature difference corresponding to the magnitude of the positive difference signal. Similarly, the indicator 26 indicates that the left sensor 20 is warmer in response to a negative difference signal and indicates a temperature difference corresponding to the magnitude of the negative difference signal.

Referring still to FIG. 2, a derivative circuit 28 is responsive to the signal produced by the left temperature sensor 20, that is, the left signal. The derivative circuit 28 is responsive to the left signal to produce a positive derivative signal having a magnitude corresponding to the rate of change of the left signal when the left signal is increasing and produces a negative differential signal having a magnitude corresponding to the rate of change of the left signal when the left signal is decreasing. As shown in broken lines in FIG. 2, the derivative circuit 28 may alternately be responsive to the right signal produced by the right temperature sensor 18. Also, the derivative circuit 28 may alternately be responsive to a third signal produced by a third temperature sensor 30 as shown in FIG. 2 in broken lines. The third temperature sensor 30 may be mounted on the aircraft 10 in any location where ample airflow is provided and the sensor 30 is sheltered from direct sunlight. In yet another form of the present invention, the derivative circuit 28 is responsive to an average of the right signal and the left signal. As shown in FIG. 2 in broken lines, an averaging circuit 32 produces an average signal from the left and right signals from the sensors 18 and 20. The derivative circuit 28 is then responsive to the average signal produced by the averaging circuit 32. Regardless of the source of the signal to the derivative circuit 28, a derivative indicator 34 is responsive to the positive and negative derivative signals for indicating a warming temperature change in response to the positive derivative signal and indicating a rate of temperature change corresponding to the magnitude of the positive differential signal. Similarly, the derivative indicator 34 indicates a cooling temperature change in response to a negative derivative signal and indicates a rate of temperature change corresponding to the magnitude of the negative derivative signal.

It has been found that all of the various forms of the present invention where the derivative circuit is responsive to the right temperature sensor, the left temperature sensor, both the right and left temperature sensors, or to a third temperature sensor, function generally equivalently. Due to the simplicity of construction and operation, the embodiments employing the right or left temperature sensors 18 or 20 are preferred.

The difference circuit 24 may be any electrical circuit capable of measuring a difference between the right signal provided by the right temperature sensor 18 and the left signal provided by the left temperature sensor 20, such as a differential amplifier circuit or even a passive voltmeter. The derivative circuit 28 may be any type of electrical circuit which produces a signal corresponding to the rate of change of another signal. The derivative circuit 28 should produce positive or negative signals in response to increasing or decreasing signals. The difference circuit 24 and the difference indicator 26 should be matched so that the difference indicator 26 can provide the pilot with information which is easily observed. The difference indicator 26 can be any type of indicator which can indicate a temperature difference and whether the right temperature sensor 18 or the left temperature sensor 20 is warmer. Thus, the difference indicator 26 may be a meter, a system of lights, buzzers, or the like. The derivative circuit 28 and the derivative indicator 34 should be matched so that the pilot can readily observe the indicated rate of temperature change and whether the temperature change is an increase or decrease. Any meter, system of lights, buzzers, or the like, operable to so indicate may be used. With respect to the difference circuit 24 and the difference indicator 26, the sensitivity of the thermal navigator should preferably be such that a full scale reading occurs when a temperature difference is as low as one degree centigrade between the right temperature sensor 18 and the left temperature sensor 20. In addition, the difference circuit 24 should have a high common mode rejection ratio so that brief variations in the ambient air temperature do not effect the reading. The sensitivity of the difference circuit 24 and difference indicator 26 should be adjustable over a range of 1° C. to 10° C. to suit the aircraft and pilot requirements.

The third temperature sensor 30, if used, can be any type of component responding electrically to temperature, such as a thermister, a diode, or the like. The third temperature sensor 30, and the right and left temperature sensors 18 and 20, should all respond quickly to changes in temperature. Likewise, the derivative circuit 28 and the derivative indicator 34 preferably should respond quickly and be able to handle large transients without long overload recovery periods. In addition, the derivative circuit 28 and derivative indicator 34 should have a sensitivity which is adjustable from 0.01° C. per second to 0.1° C. per second.

Figure 3:
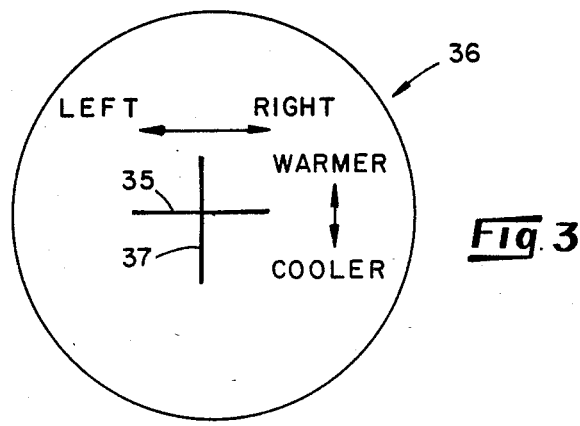
FIG. 3 is a front view of a compound meter for use in one form of the present invention.

Referring now to FIG. 3, there is shown a compound meter 36 which may be used in one form of the present invention. The compound meter 36 of FIG. 3 uses left/right indications on a horizontal axis 35 and warmer/cooler indications on a vertical axis 37. Any type of compound indicator may be used, but preferably it should have a first mode for indicating visually to the left when the left temperature sensor 20 is warmer and indicating a temperature difference and for visually indicating to the right when the right temperature sensor 18 is warmer and indicating a temperature difference. The second mode of the combined indicator should visually indicate a rate of temperature change and whether the temperature is becoming warmer or cooler by pointing up when the warmer temperature is ahead and down when the warmer temperature is behind.

Figure 4:
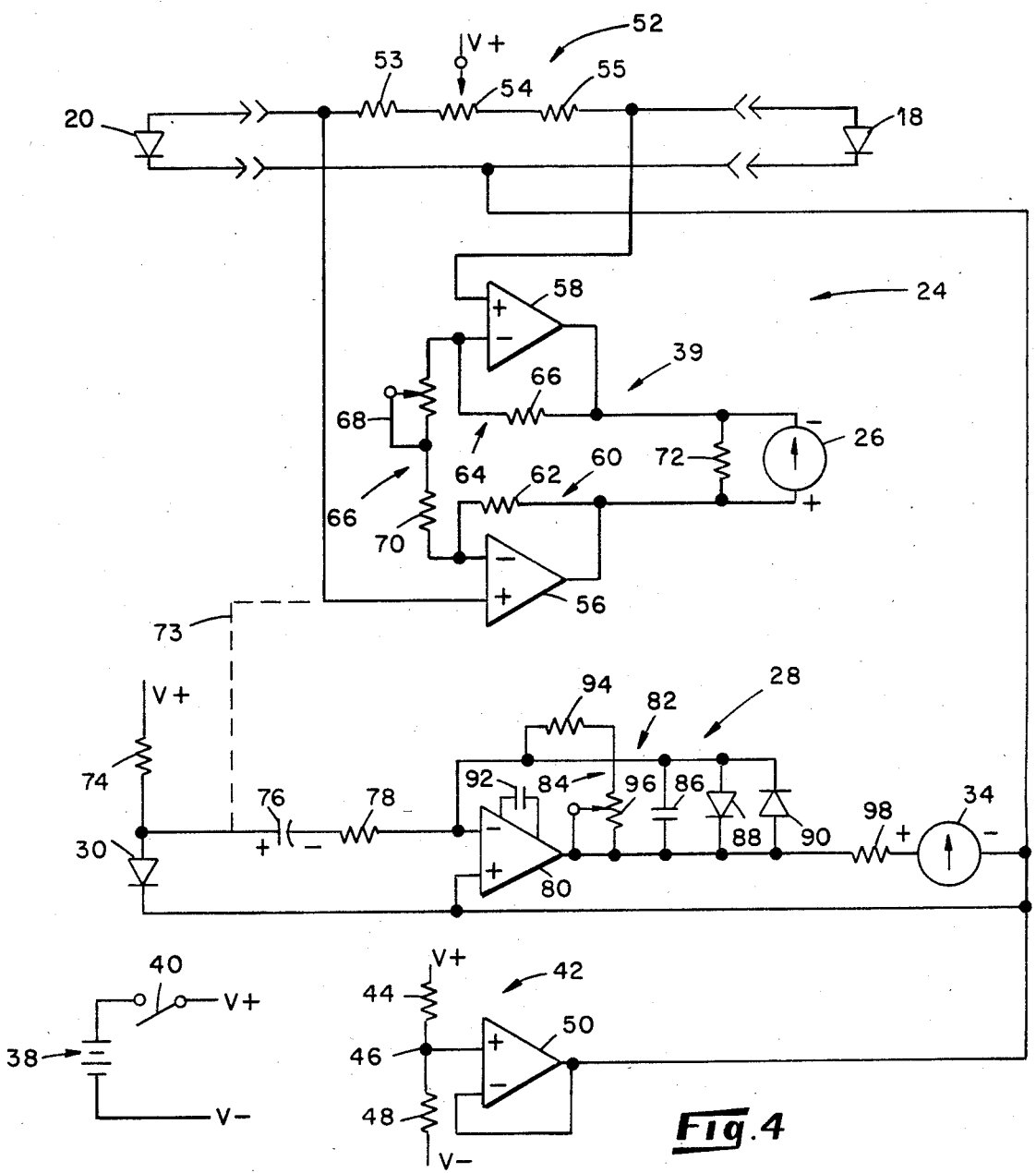
FIG. 4 is an electric circuit diagram of one form of the thermal navigator of the present invention.

Referring now to FIG. 4, there is shown a specific embodiment of the thermal navigator of the present invention. In this embodiment, the right temperature sensor 18 and the left temperature sensor 20 are part number IN 914 low noise signal diodes. The difference circuit 24 employs a paraphase differential amplifier 39 and the difference indicator 26 is a standard zero-center, plus or minus one milliamp, one hundred ohm meter movement. The derivative circuit 28 in this embodiment is a derivative amplifier and the derivative indicator 34 is a standard zero-center, plus or minus one milliamp, one hundred ohm meter movement. A third temperature sensor 30 is used in this embodiment which is also an IN 914 low noise signal diode.

As shown in FIG. 4, a battery 38 controlled by switch 40 is used to power the thermal navigator. To supply the intermediate voltage required by the paraphase differential amplifier 39, a power supply splitter circuit 42 is provided. The power supply splitter circuit 42 includes a resistor 44 connected between the positive output of the battery 38 and a node 46. A resistor 48 is connected between the negative output of the battery and the same node 46. A buffer amplifier 50 is connected between the node 46 and the output of the power supply splitter circuit 42, and, thus, the difference circuit 24 and the derivative circuit 28 are each supplied with an intermediate voltage (which is used as ground) by the power supply splitter circuit 42.

The difference circuit 24 includes a balancing circuit 52 including the right temperature sensor 18 and the left temperature sensor 20. In the circuit 52 the cathode of each of the diodes, which are the sensors 18 and 20 and, thus, are referred to by reference characters 18 and 20, are connected to the output of the power supply splitter circuit 42. The positive output of the battery 38 is connected to a potentiometer 54 connected between resistors 53 and 55 which connect to the anodes of the diodes 18 and 20. The potentiometer 54 is used to balance the circuit 52 so that the difference indicator 26 may be zeroed. The paraphase differential amplifier 39 is connected to the circuit 52 at each of the anodes of the diodes 18 and 20. A voltage observed at the anode of the right diode 18 is supplied to a right op amp 56. The voltage observed at the anode of the left diode 20 is supplied to a left op amp 58. The op amp 56 and 58 are type CA 3140 op amps. The right op amp 56 has a feed back loop 60 through resistor 62 and, correspondingly, the left op amp 58 has a feed back loop 64 through resistor 66. The gain of the paraphase differential amplifier 39 is controlled by a gain control branch 66 having potentiometer 68 and resistor 70 connected between the op amps 56 and 58. The output of the difference circuit 24 is fed to the difference indicator 26, the difference indicator 26 having been described in detail previously, with a resistor 72 connected in parallel with the indicator 26.

Also shown in FIG. 4 is a specific embodiment of the derivative circuit 28 which employs the third temperature sensor 30. As has been discussed previously, either the right sensor 18, the left sensor 20, or an average of the right and left sensors 18 and 20 can be used instead of a third temperature sensor 30. For example, the anode of diode 20 could be connected as indicated by broken line 73 and resistor 74 and sensor 30 would be removed. However, in the embodiment shown, the positive output of the battery 38 is connected through resistor 74 to the anode of the diode which is the third temperature sensor 30. Connected to the anode of the diode 30 is a capacitor 76 and a resistor 78, and the resistor 78 is connected to the negative input of an amplifier 80. The cathode of diode 30 and the positive input of amplifier 80 is connected to ground (the output of amp 50). A feed back loop 82 including a gain control branch is connected to the amplifier 80. Also included in the feed back loop is capacitor 86 for smoothing the response and diodes 88 and 90 connected in opposite directions to limit the excursion and speed the overload recovery of the derivative indicator 34. A capacitor 92 connected to the amplifier provides frequency compensation. The gain control branch 84 includes a resistor 94 and potentiometer 96 which is used to adjust the gain of amplifier 80. A resistor 98 is connected between amplifier and the indicator 34. The voltage (Vout) supplied to the derivative indicator 34 is determined generally by the formula $V_{out} = -(1/RC)dV/dt$, where $dV/dt$ is the instantaneous change in voltage per unit of time at the anode of the diode 30, R is the resistance of the gain control branch 84, and C is the capacitance of the capacitor 76. In response to the output of the derivative circuit 28, the indicator 34 will respond according to the magnitude of the change in voltage per unit time and the direction of such change, i.e., increasing or decreasing voltage. Since the voltage change corresponds to temperature change at sensor 30, indicator 34 shows the change in temperature at sensor 30.

In operation, the thermal navigator will indicate the presence of and will enable the pilot of the aircraft 10 to navigate within a thermal updraft so as to obtain the maximum lift. The thermal navigator provides at least three different general types of indications depending on how the aircraft 10 is entering the thermal updraft. When the aircraft 10 is entering a thermal with the center of the thermal updraft to the left, the thermal navigator will indicate a temperature difference on the difference indicator 26 and will indicate that the left temperature sensor 20 is warmer. The derivative indicator 34 will indicate an increase in temperature while entering the thermal and will indicate a measured rate of increase. The pilot thus is informed that the aircraft 10 is entering the thermal with its center ahead and to the left. The pilot, should he wish to obtain maximum benefit from the thermal updraft, should turn to the left and observe the rate of increase in temperature. When the temperature substantially ceases to increase, the aircraft 10 will be in the center of the thermal. Should the pilot wish to circle the center of the thermal by continuing the left turn, a path may be adopted which will produce a warmer temperature to the left on the difference indicator 26 and no change will be indicated on the derivative indicator 34. If the aircraft 10 enters the thermal to the right of center, the difference indicator 26 will indicate that the right temperature sensor 18 is warmer similar to when the center of the thermal is to the left. The pilot may then institute a right turn to locate and circle the center of the thermal to obtain a maximum lift. The third general type of indication occurs when the aircraft 10 enters a thermal directly toward the center. The thermal is indicated only by the derivative indicator 34 which would indicate a warming rate of temperature change. The difference indicator 26 produces no indication in this circumstance if no temperature difference between the sensors results. When the temperature increase substantially ceases, the aircraft 10 is located in the center of the thermal. The pilot may institute a turn either to the right or left turn to circle the center by following generally the indications as already described for a thermal entered from the right or left of center.

When the aircraft 10 is leaving a thermal, the thermal navigator produces similar indications depending on the relative position of the thermal center in relation to the aircraft 10. If the aircraft 10 is leaving a thermal, with the center of the thermal updraft to the left of center, to the right of center, or directly behind the aircraft 10, the difference indicator 26 will indicate a temperature difference accordingly. The difference indicator 26 will show either the right or left sensors 18 and 20 to be warmer, or no difference will be indicated when the center of the thermal is directly behind the aircraft 10. The derivative indicator 34 will indicate a cooling rate of temperature change depending upon how directly the aircraft 10 is leaving the thermal.

The thermal navigator of the present invention not only detects the presence of a thermal updraft, but also indicates to the pilot when and how rapidly to turn to locate and circle within the center of the thermal updraft. Thus, the thermal navigator determines the relative intensity of the thermal updraft and the relative direction to the thermal center. The thermal navigator also detects the presence of a thermal and locates the center of the thermal when the thermal is entered directly toward the center. Prior devices having no fore and aft sensors have failed to detect the thermal in this circumstance. The apparatus of the present invention may employ just two wingtip sensors or, if desired, may employ a third sensor mounted in any convenient and effective location. The thermal navigator may be constructed inexpensively and is simple to use. Consequently, the present invention is well suited for use by a pilot as a pilot of an ultralight aircraft who has had little or no prior soaring experience.

Although a particular embodiment of the present invention has been described in the foregoing detailed description, it will be understood that the invention is capable of numerous modifications without departing from the spirit of the invention.

What is claimed is:

1. A thermal navigator for use in an ultralight aircraft, glider, or sailplane to detect and navigate within thermal updrafts so that lift provided by thermal updraft is maximized, said thermal navigator comprising:

right temperature sensor means mounted on the aircraft;

left temperature sensor means mounted on the aircraft and being laterally spaced-apart from said right temperature sensor means in a direction to the left of said right temperature sensor means;

temperature difference measuring means for determining whether one of said right and left temperature sensor means is warmer and for measuring a temperature difference betwen said right temperature sensor means and said left temperature sensor means;

temperature difference indicator means for indicating whether one of said right and left temperature sensor means is warmer and for indicating said measured temperature difference;

a temperature derivative sensor means mounted on the aircraft;

temperature derivative measuring means for determining whether said temperature derivative sensor means is becoming warmer or cooler and for measuring a rate of change on said temperature derivative sensor means; and temperature derivative indicator means for indicating the determination of whether said temperature derivative sensor means is becoming warmer or cooler and for indicating said measured rate of change, said indicator means having a pointer that points in one direction to indicate that the aircraft is entering the thermal and points in an opposite direction to indicate that the aircraft is leaving the thermal, said indicator means being operable to move said pointer through a range of motion to indicate how fast the aircraft is entering the thermal and being operable to move said pointer through a range of motion to indicate how fast the aircraft is leaving the thermal, whereby the aircraft may be piloted to enter a thermal at a maximum speed by maximizing the motion of said pointer and may be piloted to leave the thermal at a maximum speed by maximizing the motion of said pointer.

2. The thermal navigator of claim 1 wherein said temperature derivative sensor means is said left temperature sensor means.

3. The thermal navigator of claim 1 wherein said temperature derivative sensor means is said right temperature sensor means.

4. The thermal navigator of claim 1 wherein:

said temperature derivative sensor means is both said right temperature sensor means and said left temperature sensor means; and said temperature derivative measuring means determines whether an average of both said right temperature sensor means and said left temperature sensor means is becoming warmer or cooler and measures an average rate of temperature change of both said right temperature sensor means and said left temperature sensor means.

5. A thermal navigator for use in an ultra light aircraft, glider, or sailplane to detect and navigate within thermal updrafts so that lift provided by thermal updrafts is maximized, said thermal navigator comprising:

right temperature sensor means mounted on the right wing of the aircraft for producing a right signal corresponding to the temperature;

left temperature sensor means mounted on the left wing of the aircraft for producing a left signal corresponding to the temperature;

a difference circuit being responsive to said right signal and said left signal for producing a positive difference signal having a magnitude corresponding to the difference between said right signal and said left signal when said right signal is greater than said left signal and for producing a negative difference signal having a magnitude corresponding to the difference between said right signal and said left signal when said left signal is greater than said right signal;

a difference indicator responsive to said positive and negative difference signals for indicating that said right temperature sensor is warmer in response to said positive difference signal and indicating a temperature difference corresponding to said magnitude of said positive difference signal and for indicating that said left temperature sensor means is warmer in response to said negative difference signal and indicating a temperature difference corresponding to said magnitude of said negative difference signal;

a derivative circuit responsive to said left signal for producing a positive derivative signal having a magnitude corresponding to a rate of change of said left signal when said left signal is increasing and for producing a negative derivative signal having a magnitude corresponding to a rate of change of said left signal when said left signal is decreasing;

a derivative indicator responsive to said positive and negative signals for indicating a warming temperature change in response to said positive derivative signal and indicating a rate of temperature change corresponding to said magnitude of said positive derivative signal and for indicating a cooling temperature change in response to said negative derivative signal and indicating a rate of temperature change corresponding to said magnitude of said negative derivative signal, said indicator means having a pointer that points in one direction to indicate that the aircraft is entering the thermal and points in an opposite direction to indicate that the aircraft is leaving the thermal, said indicator means being operable to move said pointer through a range of motion to indicate how fast the aircraft is entering the thermal and being operable to move said pointer through a range of motion to indicate how fast the aircraft is leaving the thermal, whereby the aircraft may be piloted to enter a thermal at a maximum speed by maximizing the motion of said pointer and may be piloted to leave the thermal at a maximum speed by maximizing the motion of said pointer.

6. The thermal navigator of claim 5 wherein said temperature derivative circuit is responsive to said right signal and produces a positive derivative signal having a magnitude corresponding to a rate of change of said right signal when said right signal is increasing and for producing a negative derivative signal having a magnitude corresponding to a rate of change of said right signal when said right signal is decreasing.

7. The thermal navigator of claim 5 further comprising a third temperature sensor means mounted on said aircraft for producing a third signal corresponding to the temperature.

8. The thermal navigator of claim 7 wherein said derivative circuit is responsive to said third signal and produces a positive derivative signal corresponding to a rate of change of said third signal when said third signal is increasing and for producing a negative derivative signal corresponding to a rate of change of said third signal when said third signal is decreasing.

9. The thermal navigator of claim 5 wherein said difference circuit is a paraphrase differential amplifier.

10. The thermal navigator of claim 5 wherein said derivative circuit is a derivative amplifier.

11. The thermal navigator of claim 5 wherein said right temperature sensor means and said left temperature sensor means are low noise signal diodes.

12. The thermal navigator of claim 5 wherein said difference indicator and said derivative indicator are combined in a compound indicator having a first mode for indicating said temperature difference visually to the left when said left temperature sensor means is warmer and indicating said temperature difference visually to the right when said right temperature sensor means is warmer, said compound indicator having a second mode for indicating visually said rate of temperature change and indicating whether the temperature is becoming warmer or cooler on a scale which is generally perpendicular to the left and right visual indications of temperature difference.

* * * * *